US012168973B2

(12) United States Patent
Moeller et al.

(10) Patent No.: US 12,168,973 B2
(45) Date of Patent: Dec. 17, 2024

(54) OFFSHORE ARRANGEMENT, A CONNECTING DEVICE, AND A METHOD FOR PROVIDING AN ELECTRICAL OFFSHORE CONNECTION

(71) Applicant: Siemens Gamesa Renewable Energy A/S, Brande (DK)

(72) Inventors: Jesper Moeller, Esbjerg (DK); Johnny Soerensen, Videbæk (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 953 days.

(21) Appl. No.: 16/967,245

(22) PCT Filed: Feb. 7, 2019

(86) PCT No.: PCT/EP2019/053035
§ 371 (c)(1),
(2) Date: Aug. 4, 2020

(87) PCT Pub. No.: WO2019/158431
PCT Pub. Date: Aug. 22, 2019

(65) Prior Publication Data
US 2020/0370541 A1 Nov. 26, 2020

(30) Foreign Application Priority Data

Feb. 16, 2018 (EP) .................................... 18157207

(51) Int. Cl.
*H02G 1/10* (2006.01)
*F03D 80/80* (2016.01)
(Continued)

(52) U.S. Cl.
CPC .............. *F03D 80/85* (2016.05); *H02G 1/10* (2013.01); *H02G 9/02* (2013.01); *H02G 15/10* (2013.01);
(Continued)

(58) Field of Classification Search
CPC .. H01R 13/523; H01R 13/5221; H01R 43/26; H02G 1/10
See application file for complete search history.

(56) References Cited

U.S. PATENT DOCUMENTS

2011/0241347 A1 10/2011 Boureau et al.
2014/0338918 A1* 11/2014 Millheim .............. E21B 17/012
166/344
(Continued)

FOREIGN PATENT DOCUMENTS

EP 2237380 * 3/2010
EP 2 518 310 A1 10/2012
(Continued)

OTHER PUBLICATIONS

EP Communication pursuant to Article 93(3) EPC dated Oct. 28, 2020 for Application No. 18 157 207.4.
(Continued)

*Primary Examiner* — Chau N Nguyen
(74) *Attorney, Agent, or Firm* — Schmeiser, Olsen & Watts, LLP (57) ABSTRACT

An offshore arrangement, a connecting device, and a method for providing an electrical offshore connection. An offshore arrangement, in particular offshore wind farm, including a first substation, second substation, a first connecting cable electrically connected to the first substation, a second connecting cable electrically connected to the second substation, and an intermediate cable electrically connecting the first and the second cable, wherein at least one of the first and the second connecting cable is more flexible than the intermediate cable. Thus, by using the less flexible cable, costs for a cable connection between substations may be reduced.

12 Claims, 6 Drawing Sheets

(51) Int. Cl.
　　　*H02G 9/02*　　　(2006.01)
　　　*H02G 15/10*　　(2006.01)
(52) U.S. Cl.
　　　CPC ....... *F05B 2240/93* (2013.01); *F05B 2240/95* (2013.01); *F05B 2240/96* (2013.01)

(56) References Cited

U.S. PATENT DOCUMENTS

| | | | | |
|---|---|---|---|---|
| 2016/0114863 | A1* | 4/2016 | Cermelli | B63B 22/04 |
| | | | | 29/428 |
| 2016/0148720 | A1* | 5/2016 | Kanagawa | H01B 7/04 |
| | | | | 29/869 |
| 2016/0301198 | A1* | 10/2016 | Manabe | H02G 1/10 |
| 2019/0217926 | A1 | 7/2019 | Siegfriedsen | |

FOREIGN PATENT DOCUMENTS

| | | |
|---|---|---|
| EP | 2696123 A1 | 2/2014 |
| EP | 2943683 A1 | 11/2015 |
| EP | 2 993 270 A1 | 3/2016 |
| EP | 3 034 388 A1 | 6/2016 |
| EP | 3086424 A1 | 10/2016 |
| GB | 2 524 252 A | 9/2015 |
| JP | 2016514225 A | 5/2016 |
| JP | 2019536691 A | 12/2019 |
| WO | 2009/013766 A1 | 1/2009 |
| WO | WO 2011/076957 A1 | 6/2011 |
| WO | WO 2014109705 A1 | 7/2014 |

OTHER PUBLICATIONS

International Search Report and Written Opinion dated Jun. 12, 2019 for PCT/EP2019/053035.
Japanese Office Action dated Sep. 6, 2021 for Japanese Patent Application No. 2020-543495.

* cited by examiner

OFFSHORE ARRANGEMENT, A CONNECTING DEVICE, AND A METHOD FOR PROVIDING AN ELECTRICAL OFFSHORE CONNECTION

CROSS-REFERENCE TO RELATED APPLICATIONS

This application claims priority to PCT Application No. PCT/EP2019/053035, having a filing date of Feb. 7, 2019, which is based on EP Application No. 18157207.4, having a filing date of Feb. 16, 2018, the entire contents both of which are hereby incorporated by reference.

FIELD OF TECHNOLOGY

The following relates to an offshore arrangement, in particular a wind farm, a connecting device for connecting offshore cables, and a method for providing an electrical offshore connection.

BACKGROUND

Wind farms may be provided offshore and may comprise a plurality of wind turbines. Water depths over approx. 40 meters however may require the use of floating foundations moored to the seabed, wherein the floating foundation may be fully or partly submerged (semi-submerged). Heavy floating foundations which may weigh several hundred tons may be relatively stable. However, the floating foundations may be placed in a very dynamic ocean environment, and depending on type of floating foundation movements due the influence of wind, swells and large waves may occur. In particular, the movement of ocean currents at different depths can impose heavy loads on, for example, the power cables connected to the structure—even though the depth at which it is deployed from the platform is below the influence of the waves. The cable must be able to accommodate all movement and loading from the ocean, as well as its own weight.

Especially cable connections to or between floating foundations (e.g. for wind turbines) may be quite expensive due to the necessity of robust flexible cables (non-rigid cables) as a consequence of the natural movement of the floating foundations and the cables themselves.

SUMMARY

An aspect relates to an improved offshore arrangement and/or connecting device, and/or method for providing an electrical offshore connection.

Accordingly, an offshore arrangement, in particular offshore wind farm, is provided. The offshore arrangement comprises a first substation, a second substation, a first connecting cable electrically connected to the first substation, a second connecting cable electrically connected to the second substation, and an intermediate cable electrically connecting the first and the second cable, wherein the first and/or the second connecting cable is more flexible than the intermediate cable.

Due to movements of the substations a flexibility of the cables is required. Normally, less flexible cables are cheaper than a more flexible cables. Thus, by using partially the less flexible cable costs for a cable connection between substations may be reduced while flexibility of the cables is provided where needed.

For example, the offshore arrangement may comprise at least 10, 20, 50, 100, 150 or more substations. The substation comprises a floating foundation and a wind turbine provided on the floating foundation. "More flexible" means that a cable portion having an equal length compared to another cable portion requires less forces to be bent to the same extent, in particular the same radius. The first connecting cable, the second connecting cable and the intermediate cable may comprise a single wire (single core), three wires (three-core cable) or more. In particular, the first connecting cable, the second connecting cable and the intermediate cable are configured to conduct electricity produced from wind turbines.

According to an embodiment, the offshore arrangement further comprises a connecting device having an electrical connection connecting the first or the second connecting cable to the intermediate cable, and a volume of gas surrounding the electrical connection.

Thus, a dry environment may be provided for the electrical connection. In particular, the electrical connection comprises means to which the first connecting cable or the second connecting cable and the intermediate cable can be mounted. The offshore arrangement comprises at least 4, 8, 12, 20, 40, 70, 100, 150 or 200 connecting devices and respective cables which are electrically connected.

According to a further embodiment, the connecting device is submerged.

This has the advantage that the electrical connection may be protected from harsh sea water conditions since gas surrounds the electrical connection. Thus, a life-cycle of the connected cables may be increased. In particular, the connecting device is submerged at least 10, 20, 30, 40, 50 m below a sea level.

The connecting device is preferably designed to allow an ingress of water into a housing when the connecting device is submerged. Yet, the level of the water inside the housing is controlled by the (pressurized) volume of gas so as to stay below (i.e. stay away from the electrical connection).

According to a further embodiment, the connecting device has a housing surrounding the electrical connection and the volume of gas, the housing preferably comprising a first opening and a second opening, wherein the first or the second connecting cable passes through the first opening, wherein the intermediate cable passes through the second opening, and wherein the first opening and/or the second opening faces a seabed.

Thus, a pressure of the gas counteracts the water when the connecting device is submerged. The housing, in particular a housing portion, surrounds an inner space for the volume of gas and the electrical connection. In particular, the openings are fluidly connected to the inner space.

The housing is a rigid structure and may be made of a durable material resistant to the surrounding environment such as (coated) steel and/or composite material, e.g. comprising fiber glass. The housing may be dimensioned to allow service personal (divers) to enter when submerged below a sea level. In particular, the buoyancy of the connecting device should be large enough to avoid excessive movement due to sea currents. The housing is a module in which the electrical connection may be mounted when the electrical connection is completed.

According to a further embodiment, the housing comprises a bell-shaped portion and/or a bottom plate having the first and the second opening.

The bottom plate is connected to the bell-shaped portion by a connector or connecting means, in particular screws. This has the advantage that the connecting device may be assembled offshore.

According to a further embodiment, the connecting device comprises a T-connector connecting the first or the second cable to the intermediate cable.

Thus, standard components may be used such that cost may be reduced and availability may be increased. Preferably, a T-connector is provided for each wire pair to be electrically connected.

According to a further embodiment, the offshore arrangement comprises further an anchor connected to the connecting device and configured to keep the connecting device submerged.

In particular, the anchor may be fixed to the seabed. The connecting device is connected to the anchor by a flexible connector or flexible connecting means, e.g. ropes, chains and the like.

According to a further embodiment, the connecting device comprises a valve for releasing a pressure of the gas.

This has the advantage that overpressure may be avoided. In particular, the valve is fluidly connected to the inner space.

According to a further embodiment, the connecting device comprises an interface for a pressure maintenance line which is connectable to a compressor for providing gas.

In particular, the compressor may be located on the vessel. Thus, the pressure inside the inner space may be adapted from the vessel. The interface may also be included in the valve.

According to a further embodiment, the connecting device comprises a pressure adjustment unit for adjusting the pressure of the gas, in particular in response to pressure changes of water surrounding the connecting device (e.g. when the sea level rises or becomes lower).

Thus, pressure drops or loss in pressure may be avoided. The pressure adjustment unit may comprise a container filled with gas and configured to release gas into the inner space. In particular, the valve and the pressure adjustment unit may be included in one component. The interface may also be included in the pressure adjustment unit.

According to a further embodiment, the offshore arrangement further comprises a pipe arranged on the seabed, wherein the intermediate cable extends, at least partially, through the pipe.

The pipe is provided for accommodating a cable portion of the intermediate cable. In particular, the cable portion may be the longest part of the cable.

According to a further embodiment, the first or the second connecting cable comprises more cable strands than the intermediate cable.

Due to an increased amount of cable strands a greater flexibility of the respective cable may be achieved. Each wire comprises a plurality of cable strands. In particular, the first connecting cable or the second connecting cable may comprise at least 2, 5, 10, 20 or 100 times more cable strands than the intermediate cable.

Further, a connecting device for connecting offshore cables is provided. The connecting device is configured to provide an electrical connection electrically connecting a first submerged offshore cable to a second submerged offshore cable and configured to provide a volume of gas surrounding the electrical connection when the connecting device is submerged.

Any embodiment and feature of the offshore arrangement apply mutatis mutandis to any embodiment and feature of the connecting device and vice versa.

This has the advantage that electrical connections between different cables which are submerged may be protected from adverse conditions. The effort for providing a long-live submerged connection is reduced. The connecting device may be also used for the same type of cables to be placed over long distances where production and transportation of such cables sets a limit on cable section length. Exchange of a cable can also be done more cost efficient by avoiding the use of more expensive subsea joints.

Thus, the concept can also be used to connect cost efficient compensation systems for electrical midway compensation to reactors or capacitors suspended from an anchor block. This may enable the use of very long HVAC (high voltage alternating current) export cables. The solution can be applied at any voltage level from today's normal level at 36 kV (kilovolts) to the recent 66 kV and also future 145 kV array voltage levels. In particular, the connecting device may be used for higher export voltage levels at 400 kV levels.

By using the connecting device submerged under water, the connection point between e.g. two cables, can be protected from the surrounding water. Pressure of the outside water keeps the gas trapped inside the connecting device while the gas prevents water from entering the connecting device.

In particular, the connecting device is configured to act as buoyancy member stabilizing the cables as well as enabling slight movement.

Furthermore, a method for providing an electrical offshore connection is provided. The method comprises the step of electrically connecting, offshore, a first electrical cable to a second electrical cable to provide an electrical connection, the second electrical cable being more flexible than the first electrical cable.

Any embodiment and feature of the offshore arrangement apply mutatis mutandis to the method and vice versa. Further, any embodiment and feature of the connecting device apply mutatis mutandis to the method and vice versa.

According to a further embodiment, the electrical connection is surrounded by a volume of gas when submerged.

According to a further embodiment, a gas pressure is increased as an immersion depth of the electrical connection is increased.

In particular, a pressure maintenance line is connected to the connecting device, in particular the inner space, and to a compressor at a vessel. The compressor and the pressure maintenance line are configured to blow gas, in particular air, into the connecting device during submerging of the connecting device. The connecting device and preferably the anchor are submerged, in particular by a crane.

Preferably, a pressure inside the connecting device, in particular the inner space, is adjusted when lowering the connecting device such that essentially water dose not enter the connecting device, in particular the inner space. Thus, the electrical connection is still surrounded by the volume of gas when submerged.

The anchor is lowered before the connecting device. In particular, the connecting device may be lowered towards the anchor until reaching connecting means for being connected to the anchor.

In particular, the connecting device is pressurized with a test pressure which is greater than a pressure inside the connecting device to be maintained.

Further possible implementations or alternative solutions of embodiments of the invention also encompass combinations that are not explicitly mentioned herein of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
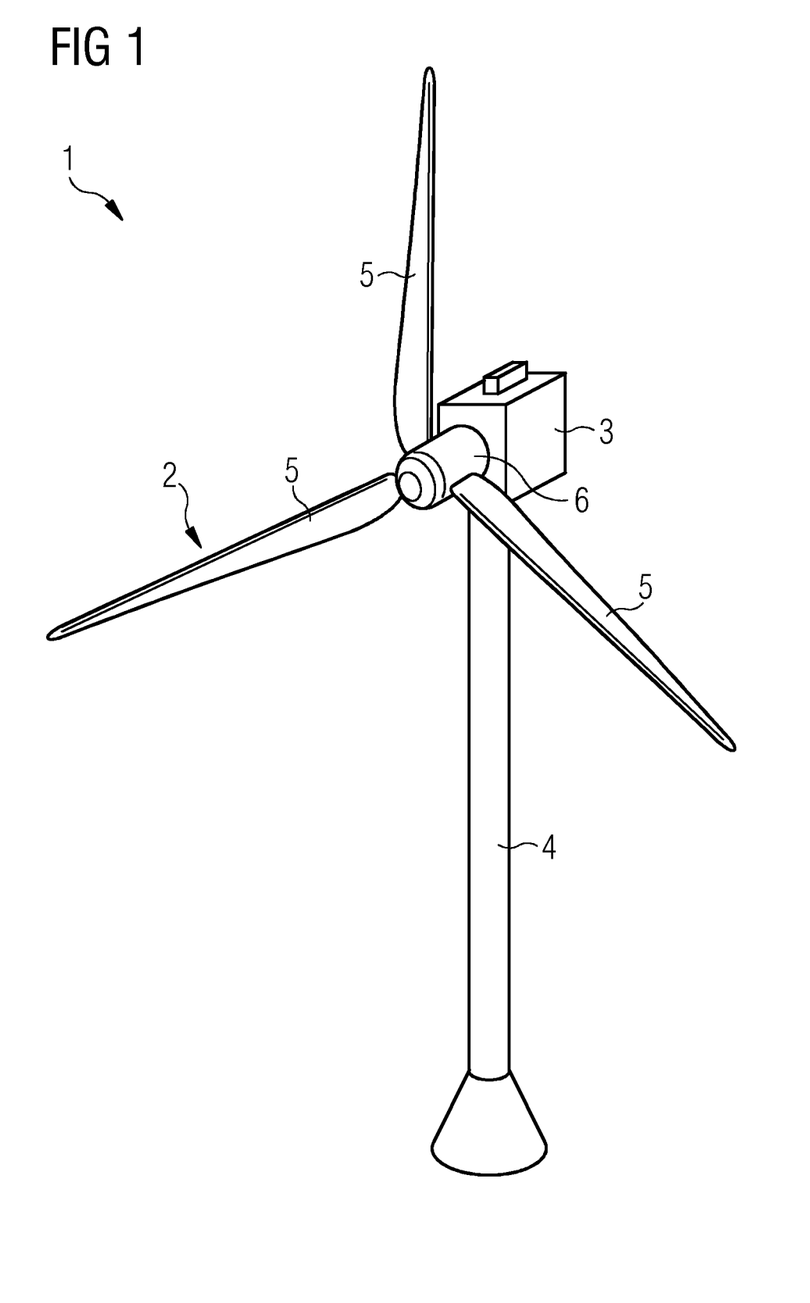
FIG. 1 shows a perspective view of a wind turbine.

FIG. 1 shows a wind turbine 1. The wind turbine 1 comprises a rotor 2 connected to a generator (not shown) arranged inside a nacelle 3. The nacelle 3 is arranged at the upper end of a tower 4 of the wind turbine 1. The nacelle 3 is rotatable connected to the tower 4.

The rotor 2 comprises three blades 5. The blades 5 are connected directly or indirectly to a hub 6 of the wind turbine 1. Rotors 2 of this kind may have diameters ranging from, for example, 30 to 160 meters or even more. The blades 5 are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
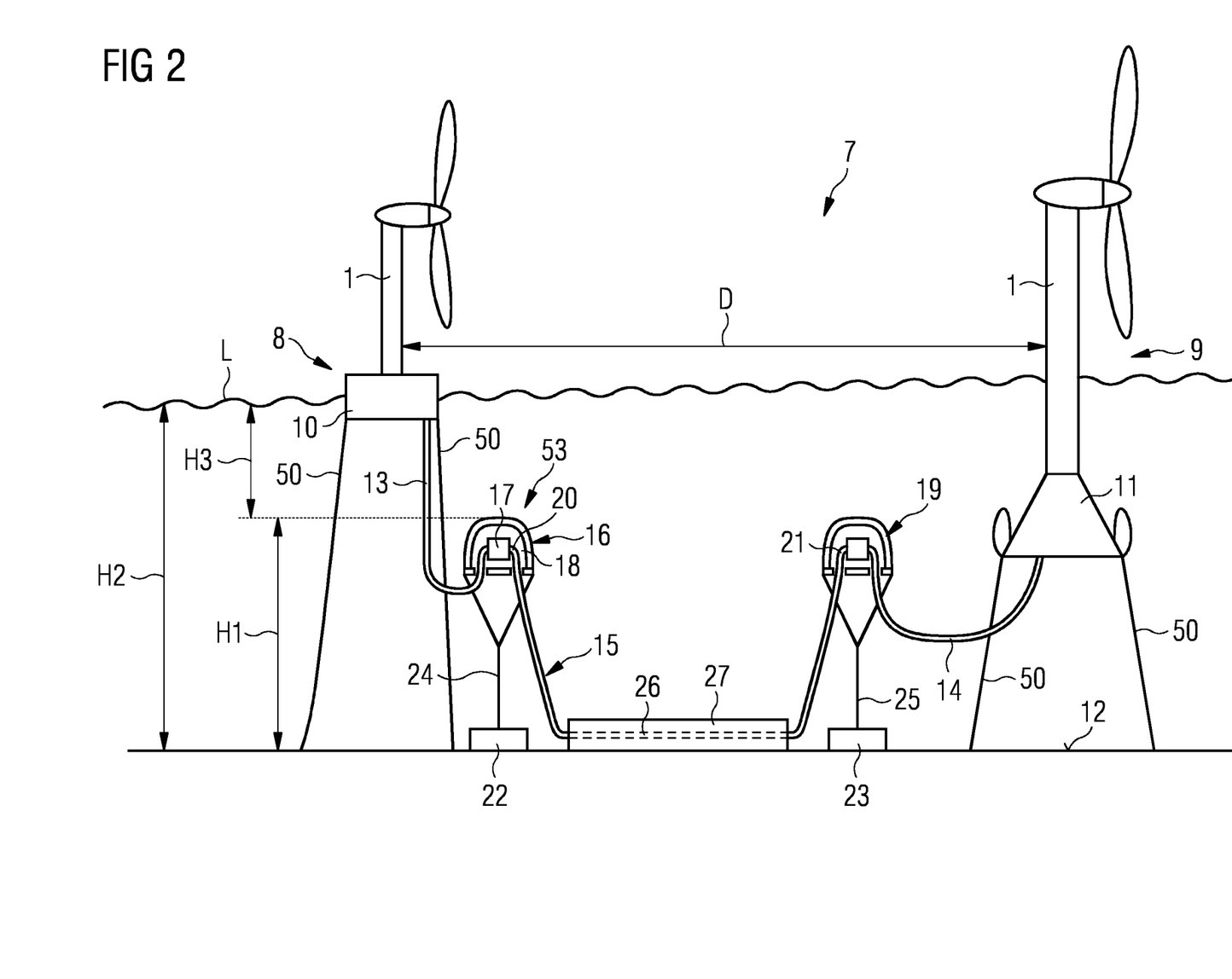
FIG. 2 shows schematically an offshore arrangement.

FIG. 2 shows an offshore arrangement 7. The offshore arrangement 7 may be an offshore wind farm. The offshore arrangement comprises a substation 8 (also referred to first substation) and a substation 9 (also referred to second substation). The substation 8, for example, comprises a floating foundation 10 which is partly submerged and a wind turbine 1 connected to the floating foundation 10. The floating foundation 10 is moored to a seabed 12. The substation 9, for example, comprises a floating foundation 11 which is moored to the seabed 12 and which is e.g. fully submerged, and a wind turbine 1 connected to the floating foundation 11. The substations 8, 9 may be connected to the seabed 12 by ropes 50 which are fixed to the seabed 12 or anchors (not shown).

Alternatively, at least one of the substations 8, 9 may comprise an observation tower, a transformer and/or converter station (not shown) etc., in particular instead of the wind turbine 1. Further, the substations 8, 9 may be identical.

The offshore arrangement 7 comprises a cable 13 (also referred to first connecting cable) electrically connected to the substation 8, a cable 14 (also referred to second connecting cable) electrically connected to the substation 9, and a cable 15 (also referred to intermediate cable) electrically connecting the cables 13, 14. The cable 13 and/or the cable 14 may be more flexible than the cable 15. This has the advantage that the flexible cable 13, 14 may follow movements of the substation 8, 9 without being damaged, in particular from time to time due to exhaust of the cable 13, 14. The cables 13, 14, 15 may be provided as armored cables having a lead sheath. In particular, the cables 13, 14, 15 may be provided for at least 10, 40, 100, 300 or 500 kV, e.g. for 45 kV-275 kV. For example, the cable 13, 14 may comprise more cable strands than the cable 15 for achieving an increased flexibility. In particular, the cable 13 and/or the cable 14 may comprise at least 2, 5, 10, 20 or 100 times more cable strands than the cable 15.

Providing the less flexible cable 15 between the substations 8, 9, may reduce costs of the cabling. Thus, it may be advantageous to use the cable 15 at least for 50, 60, 70, 80, 90, 95, 98, 99% of a distance D between the substation 8 and the substation 9. For example, the offshore arrangement 7 may comprise at least 10, 20, 50, 100, 150 or more substations 8, 9.

Further, a connecting device 16 is provided which comprises an electrical connection 17 connecting the cable 13 to the cable 15 and a volume 18 of gas surrounding the electrical connection 17. Optionally, a connecting device 19 may be provided connecting the cable 14 to the cable 15. The connecting devices 16, 19 may be identical. For example, one end 20 of the cable 15 is connected to the connection 17 and the other end 21 of the cable 15 is connected to the connecting device 19. Alternatively, the other end 21 may be connected directly to another offshore platform (not shown) or an onshore arrangement.

The connecting device 16, 19 is submerged. An anchor 22, 23 (e.g. made of concrete or steel) is connected, in particular by a rope 24, 25, to the connecting device 16, 19. The anchor 22, 23 is configured to keep the connecting device 16, 19 submerged. The anchor 22, 23 lies on the seabed 12. A distance between the seabed 12 and the sea level L is H2. A distance between the sea bed 12 and the connecting device 16 is H1 and a distance between the connecting device 16 and the sea level L is H3. In particular, the distance H3 is at least 10, 20, 30, 40, 50 m.

For example, a cable portion 26 (see broken lines) of the cable 15 lies on the seabed 12. Optionally, a pipe 27 arranged on the seabed 12 is provided for accommodating the cable portion 26. Thus, the cable portion 26 protrudes through the pipe 27. Hence, the pipe 27 is configured to protect the cable portion 26 from external influences. The cable portion 26 may be the longest part of the cable 15.

Figure 3:
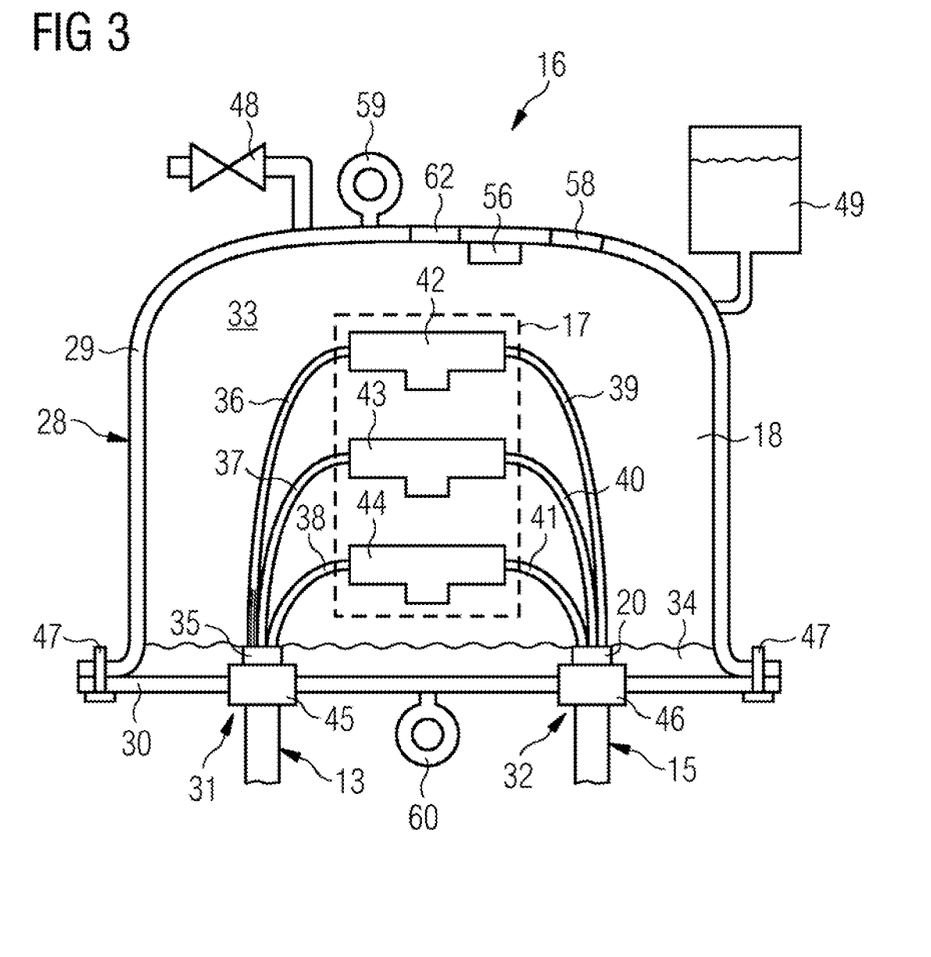
FIG. 3 shows a connecting device.

FIG. 3 shows the connecting device 16, in particular from FIG. 2. The connecting device 16 has a housing 28 surrounding the electrical connection 17 and the volume 18 of gas. The housing 28 comprises a portion 29, which is in particular bell-shaped, and a bottom plate 30 having an opening 31 (also referred to first opening) for the cable 13 and an opening 32 (also referred to second opening) for the cable 15. The opening 31 and the opening 32 face the seabed 12 when the connecting device 16 is submerged.

The portion 29 houses an inner space 33 of the connecting device 16. The gas is arranged inside the inner space 33. For example, water 34 may ingress into the inner space 33. However, the connecting device 16 is configured to keep the water 34 at a low level (e.g. 40 cm).

One end 35 protrudes into the inner space 33. The end 35 is electrically connected to the end 20 by the electrical connection 17. For example, the end 35 comprises three wires 36, 37, 38. Also, the end 20 may comprise three wires 39, 40, 41. In particular, the connecting device 16 comprises a T-connector 42 connecting the wire 36 and the wire 39 and/or a T-connector 43 connecting the wire 37 and the wire 40 and/or a T-connector 44 connecting the wire 38 and the wire 41.

For example, the wire 36, 37, 38, 39, 40, 41 comprise AC power cables, three-phase power cables and/or a signal cable and/or a communication cable. Moreover, the ends 20, 35 may comprise further wires (not shown) connected to each other. Each wire 36, 37, 38, 39, 40, 41 may comprise a plurality of cable strands. In particular, the or each wire 36, 37, 38, 39, 40, 41 may be dimensioned for at least 10, 40, 100, 300 or 500 kV, e.g. for 45 kV-275 kV.

The cables 13, 15 may be fixed to the bottom plate 30 by cable fixings 45, 46 provided at the openings 31, 32. Alternatively, the bottom plate 30 may comprise at least or exactly two, three, four, five, six or more openings (not shown) for respective cables to be wired. The bottom plate 30 may be fixed to the portion 29 by connecting means 47, e.g. screws and the like.

The connecting device 16 comprises a valve 48 for releasing a pressure of the gas. This has the advantage that overpressure may be avoided. In particular, the connecting device 16 comprises a pressure adjustment unit 49 for adjusting the pressure of the gas. Thus, pressure drops or loss in pressure may be avoided. The pressure of the outside water 34 keeps the gas trapped inside the housing 28 while the gas essentially prevents water 34 from entering the housing 28 and, thus, getting into contact with the electrical connection 17. At the same time the connecting device 16 acts as buoyancy member that will stabilize the system as well as enable slight movement.

Figure 4:
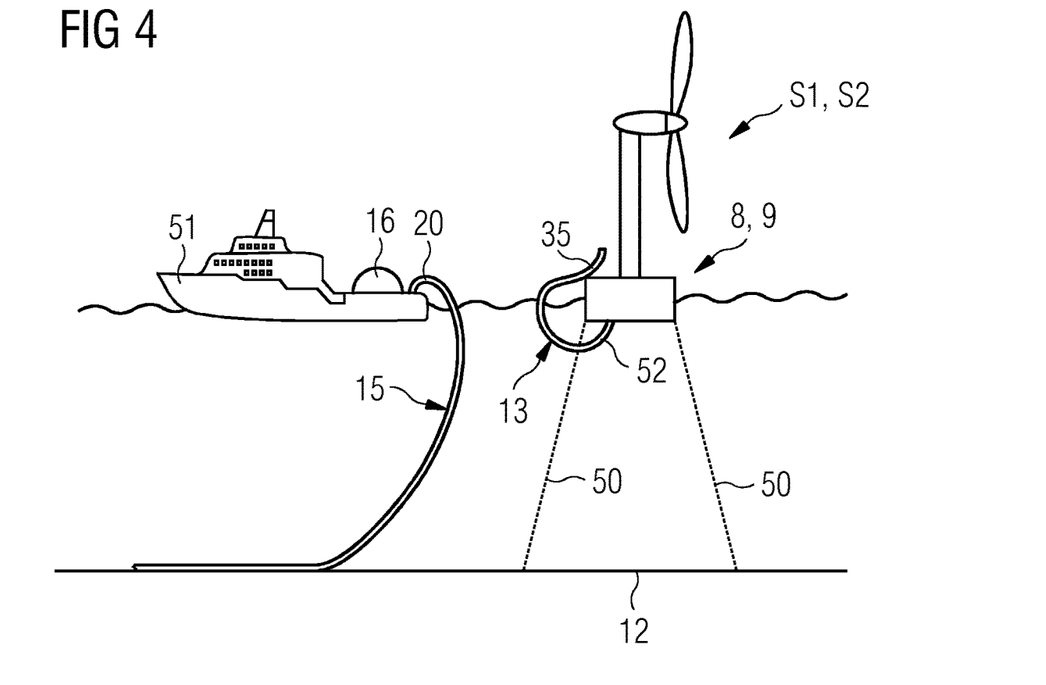
FIG. 4 shows schematically method steps of a method for providing an electrical offshore connection.
Figure 5:
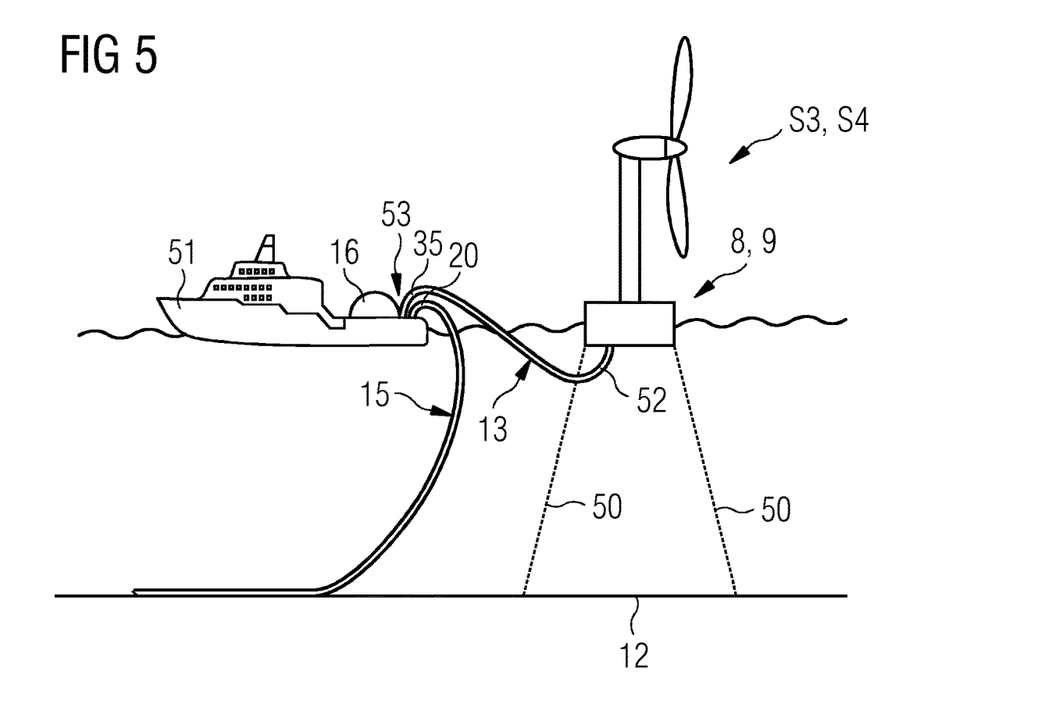
FIG. 5 shows schematically further method steps of the method for providing an electrical offshore connection.
Figure 6:
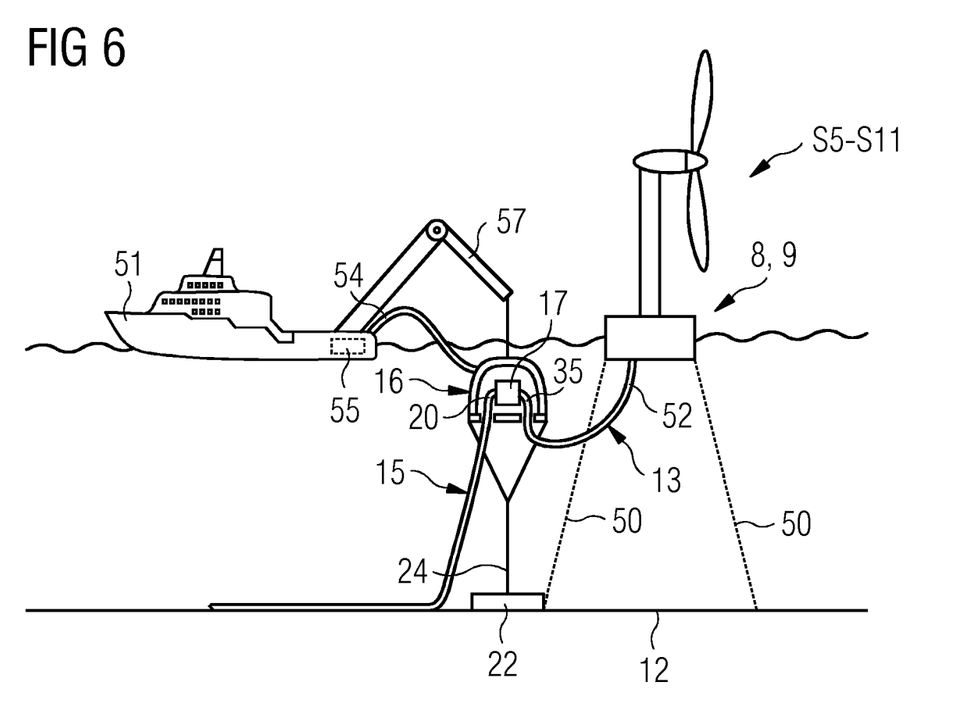
FIG. 6 shows schematically further method steps of the method for providing an electrical offshore connection.

The connecting device 16 is configured to be assembled offshore on a vessel (see FIGS. 4-6). Further, cables 13, 15 and/or wire 36, 37, 38, 39, 40, 41 are configured to be connected offshore on the vessel (see FIGS. 4-8). The gas may be air or another gas. The connecting device 16 may comprise a pressure sensor 56 configured to determine a pressure inside the inner space 33 or volume 18 of gas. The connecting device 16 may comprise a further sensor (not shown) configured to determine a water level inside the inner space 33.

For example, to have a simple and maintenance free monitoring system as possible, optical wires could be used to monitor the water level. In particular, fiber optic wires for simple non electrical water level monitoring can be used. This has the advantage that additional electrical signal cable from connecting device 16 to the floating foundation 10 may be omitted. The fiber optic system could be based on the concept that light waves in a translucent optic rod can be used as non-electric level measurement.

Preferably, to control the water level inside the inner space 33 a pressure of a certain magnitude must be maintained. The pressure depends on the surrounding water pressure and thus the distance H3. An amount of the distance H3 may be provided such that vessels may freely pass above the connecting device 16.

In particular, the connecting device 16 also comprises one or more hook attachment points 59 for lifting the connecting device 16 (e.g. from the installation vessel 51 see FIG. 4) as well as one or more connection points 60 for the anchor 22 used to hold the connecting device 16 in fixed position.

The connecting device 16 may comprises an interface 62 for being connected to a pressure maintenance line 54 (see FIG. 6) which is connectable to a compressor 55 (see FIG. 6) for providing gas when the connecting device is submerged.

Preferably, one or more anchors 22 placed on the seabed 12 are used for this purpose. The connecting device 16 comprises permanent retrieval lines (not shown) connected to the housing 28. Such retrieval lines should preferably be heavy in weight and long enough to avoid getting entangled in propulsion gear of vessels.

As water 34 or air may enter/escape the inner space 33 over time, the connecting device 16 is preferably also equipped with an inlet 58 to allow additional gas to be pumped into the inner space 33, e.g. from a service vessel (not shown). Advantageously, this design could be of a kind that do not involve diver interaction, and could be done via a hose lowered and connected/released from the service vessel above the connecting device (e.g. similar to the principle used for aerial refueling of aircrafts).

In particular, the valve 48 and/or the inlet 58 and/or interface 62 may be provided as one component.

In particular, the connecting device 16 may be indicated as "diving bell". For example, the connecting device 16 may be used for any connection of offshore cables (e.g. power cables and/or communication cables and the like) between offshore facilities and/or offshore to onshore facilities. The connection device 16 is configured to connect every type of cable to be submerged. Such submerged connection points of cables require extensive (and expensive) protection to withstand the harsh condition they are placed in.

FIG. 4 shows schematically method steps S1, S2 of a method for providing an electrical offshore connection 53 (see FIG. 2). In particular, in a step S1 a vessel 51 having the connecting device 16 is provided near to the substation 8, 9. In a step S2 an end 20 of the cable 15 (also referred to first electrical cable) is provided on a vessel 51. The end 35 of the cable 13 (also referred to second electrical cable) is arranged on the substation 8, 9.

Another end 52 of the cable 13 is connected to the substation 8, 9. Alternatively, the end 52 could also be connected to the substation after it has been connected to the end 20. This can be done, for example, before or after the connecting device 16 has been submerged (see FIG. 6). An initial step may be provided of retrieving the end 20 from the seafloor 12. The cable 13 is more flexible than the cable 15.

FIG. 5 shows schematically method steps S3, S4 of the method for providing the electrical offshore connection 53 (see FIG. 2). Preferably, in a step S3 the end 35 is transferred to the vessel 51. In particular, in a step S4 the cable 15 is connected to the cable 13 to provide an electrical connection 17. In particular, in further steps the two cables 13, 15 and the connecting device 16 are connected and assembled as shown in FIG. 2 or 3 on the vessel 51.

Alternatively, the end 35 is retrieved first and afterwards the end 20 from the seabed 12.

FIG. 6 shows schematically further method steps S5-S11 in which the connecting device 16, the electrical connection 17 and the ends 20, 35 are submerged.

In particular, in a step S5 a pressure maintenance line 54 is connected to the connecting device 16, in particular the inner space 33, and to a compressor 55 at the vessel 51. The compressor 55 and the pressure maintenance line 54 are configured to push gas, in particular air, into the connecting device 16 during submerging of the connecting device 16. Preferably, in a step S6 the connecting device 16 or the connection 53 and preferably the anchor 22 are submerged, in particular by a crane 57.

Preferably, in a step S7 a pressure inside the connecting device 16, in particular the inner space 33, is adjusted when lowering the connecting device 16 such that essentially water does not enter the connecting device 16, in particular the inner space 33. Thus, the electrical connection 17 is still surrounded by the volume 18 of gas when submerged. Preferably, a gas pressure is increased as an immersion depth of the connecting device 16 is increased.

Preferably, in a step S8 the anchor 22 is lowered before the connecting device 16. In particular, the connecting device 16 may be lowered towards the anchor 22 until reaching a rope 24 for being connected to the anchor 22. In particular, in a step S9 the connecting device 17 is pressurized with a pre-pressure which is greater than a pressure inside the connecting device to be maintained.

Preferably, when the anchor 22 rests on the seabed 12 and the connecting device 16 is placed at the desired distance H1 (see FIG. 2), the pressure maintenance line 54 and/or the crane 57 may be disconnected and removed from the connecting device 17 in a step S10. In a step S11 the cables 13, 15 may be energized.

Alternatively, the connecting device 17 could also initially be placed at the desired distance H1 (or desired position). Afterwards a connection to the compressor 55 may be established.

Figure 7:
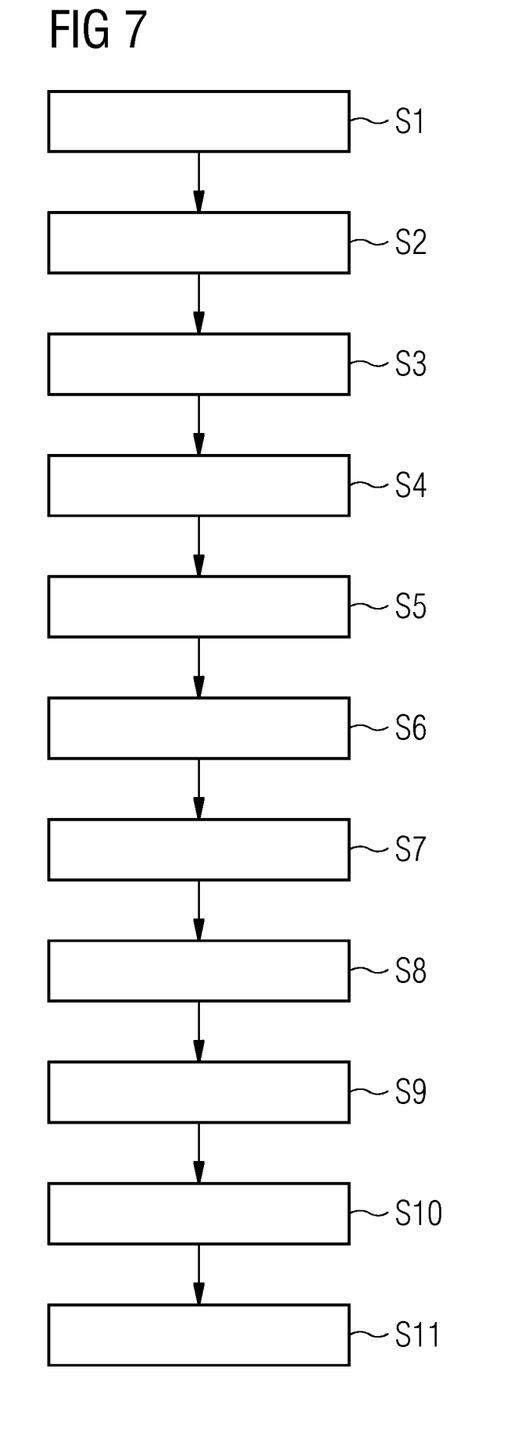
FIG. 7 shows schematically a block diagram of the method.

FIG. 7 shows schematically a block diagram of the method, wherein the method steps S1-S11 are illustrated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An offshore arrangement comprising a first substation, a second substation, a first connecting cable electrically connected to the first substation, a second connecting cable electrically connected to the second substation, and an intermediate cable electrically connecting the first and the second cable;
further comprising a connecting device having an electrical connection connecting the first or the second connecting cable to the intermediate cable, and a volume of gas surrounding the electrical connection wherein the connecting device is submerged, wherein the connecting device has a housing, the housing surrounding the electrical connection and the volume of gas, the housing comprising a first opening and a second opening, wherein the first or the second connecting cable passes through the first opening, wherein the intermediate cable passes through the second opening, and wherein the first opening and/or the second opening is fluidly connected to an inner space of the housing.

2. The offshore arrangement according to claim 1, wherein the first opening and/or the second opening faces a seabed.

3. The offshore arrangement according to claim 1, wherein the housing comprises a bell-shaped portion and/or a bottom plate having the first and the second opening.

4. The offshore arrangement according to claim 1, wherein the connecting device comprises a T-connector connecting the first or the second cable to the intermediate cable.

5. The offshore arrangement according to claim 1, further comprising an anchor connected to the connecting device and configured to keep the connecting device submerged.

6. The offshore arrangement according to claim 1, wherein the connecting device comprises an interface for a pressure maintenance line which is connectable to a compressor for providing gas.

7. The offshore arrangement according to claim 1, wherein the connecting device comprises a pressure adjustment unit for adjusting a pressure of the gas.

8. The offshore arrangement according to claim 1, further comprising a pipe arranged on a seabed, wherein the intermediate cable extends, at least partially, through the pipe.

9. The offshore arrangement according to claim 1, wherein the first or the second connecting cable comprises more cable strands than the intermediate cable.

10. The offshore arrangement of claim 1, wherein the offshore arrangement is an offshore wind farm.

11. The offshore arrangement according to claim 1, wherein the first and/or the second connecting cable is more flexible than the intermediate cable.

12. A method for providing an electrical offshore connection, comprising:
providing a connecting device, wherein the connecting device has a housing including a first opening and a second opening, wherein the first opening and/or the second opening is fluidly connected to an inner space of the housing;
electrically connecting, offshore, a first electrical cable to a second electrical cable to provide an electrical connection; wherein the electrical connection is surrounded by a volume of gas inside the housing when submerged;
wherein a gas pressure is increased as an immersion depth of the electrical connection is increased.

* * * * *